(12) United States Patent
Keller

(10) Patent No.: US 6,254,338 B1
(45) Date of Patent: Jul. 3, 2001

(54) WATER TURBINE OR WATER PUMP

(76) Inventor: Andreas Keller, An Der Sensenschmiede 3, 82491 Grainau (DE)

( * ) Notice: Subject to any disclaimer, the term of this patent is extended or adjusted under 35 U.S.C. 154(b) by 0 days.

(21) Appl. No.: 09/319,783

(22) PCT Filed: Nov. 11, 1997

(86) PCT No.: PCT/DE97/02688

§ 371 Date: Jun. 10, 1999

§ 102(e) Date: Jun. 10, 1999

(87) PCT Pub. No.: WO98/26176

PCT Pub. Date: Jun. 18, 1998

(30) Foreign Application Priority Data

Dec. 12, 1996 (DE) ............................................. 196 51 736

(51) Int. Cl.[7] ............................. F01D 17/12; F04D 29/56
(52) U.S. Cl. ...................... 415/160; 415/208.2; 416/237
(58) Field of Search ................................. 415/160, 163, 415/167, 159, 191, 192, 208.2; 416/237, 238, 228, 168 A

(56) References Cited

U.S. PATENT DOCUMENTS

| | | | | |
|---|---|---|---|---|
| 1,614,872 | * | 1/1927 | Callahan | 416/238 |
| 1,907,466 | * | 5/1933 | Terry | 416/168 A |
| 1,929,100 | * | 10/1933 | Moody | 415/191 |
| 2,663,193 | * | 12/1953 | Keast | 416/237 |

* cited by examiner

Primary Examiner—F. Daniel Lopez
Assistant Examiner—Richard Woo
(74) Attorney, Agent, or Firm—Hoffmann & Baron, LLP

(57) ABSTRACT

A water turbine or pump having a rotor (1) and a stator (2). The leading edges (13) and the trailing edges (14) at least of the rotor blades (6) form a bend (15) projecting in opposite relationship to the flow direction (12). That causes a flow force resulting in a self-cleaning effect being applied to impurities which are deposited at the leading edges (13). However the adjustment design providing for adjustability of the rotor blades remains substantially unchanged.

10 Claims, 2 Drawing Sheets

WATER TURBINE OR WATER PUMP

DESCRIPTION

Figure 1:
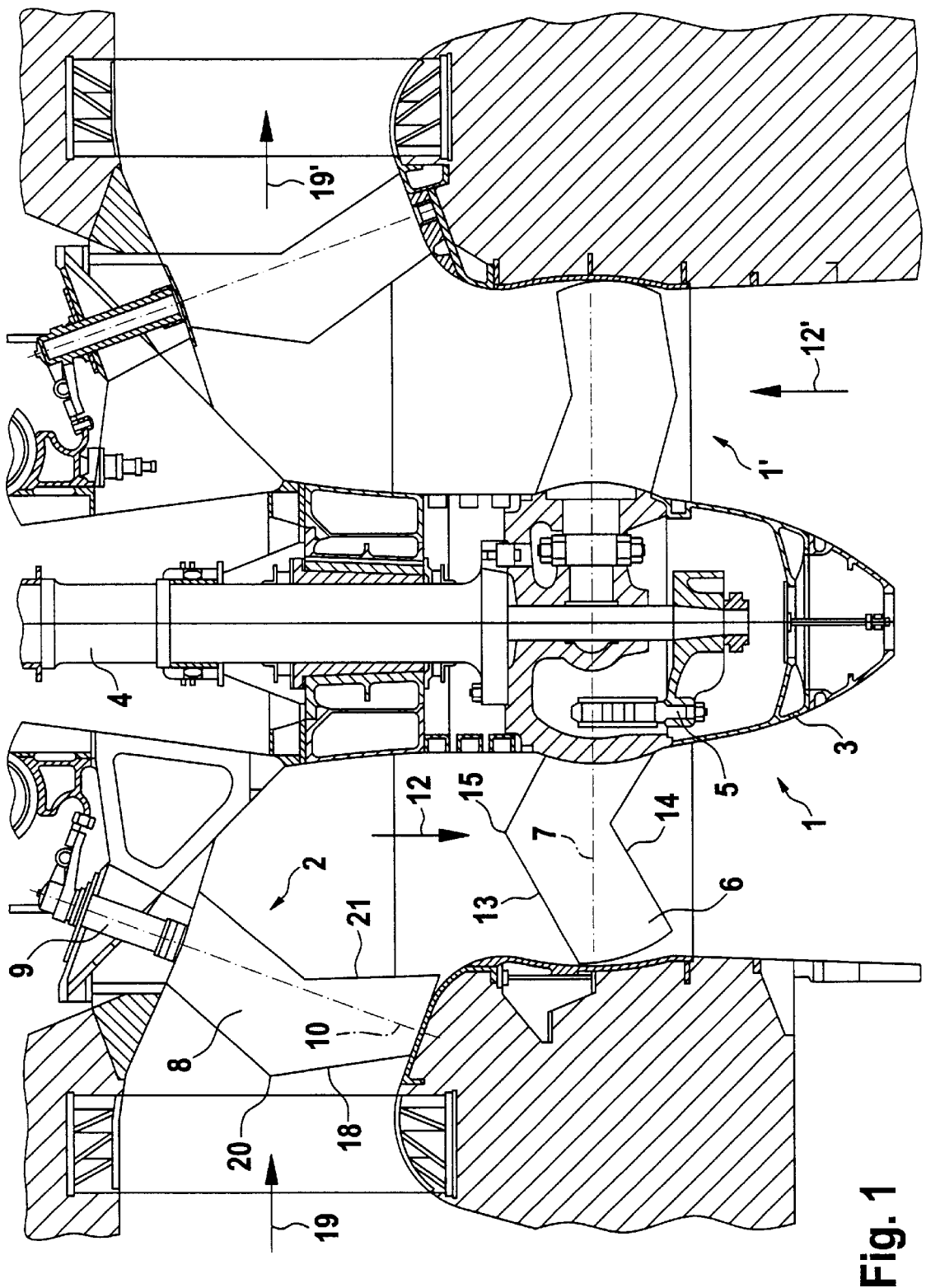

The invention concerns a water turbine or pump having a rotor and a stator which are provided with rotor blades and stator blades respectively.

Water turbines of the Kaplan or Francis type and water pumps of a corresponding configuration are frequently adversely affected in function by leaves and foliage, grass, pieces and scraps of plastic material, lumps or the like which are entrained in the water. Those items which are entrained in the water stick to the leading or afflux edges of the rotor blades and the stator blades and therefore considerably interfere with the flow around the cross-sectional profile of those blades. As a result the level of efficiency in part falls considerably and, in the case of water pumps, that, together with reductions in the through-flow rate, results in a sharp rise in the power draw. Those disadvantageous effects make themselves particularly felt in relation to water turbines and water pumps of the specified kind, which are of medium or small size and in which consequently not only the trailing edges but also the leading edges, in the form of a profile nose, are comparatively sharp. For, those relatively sharp leading edges also already retain entrained fibres or leaves and foliage of relatively small extent.

In order to reduce or entirely eliminate the tendency of the blades to retain solid body impurities and contaminants entrained by the water, it is already known for the leading edges of the rotor and/or stator blades to be of a rearwardly curved configuration, as viewed in the direction of flow (EP-A 475 920). That arrangement, unlike the leading edges which generally extend substantially perpendicularly to the direction of flow, is intended to set the leading edges in relation to the flow direction in such a way that flow components are effective which are also parallel to the leading edge and foreign bodies which are thereby held fast thereby are swept away. In the case of blades which are non-adjustable in relation to the flow, as is the case for example with Francis turbines, a suitable configuration is relatively easy to implement. Particularly in the case of rotor blades which are adjustable in dependence on flow, as is the case with Kaplan turbines and water pumps of a corresponding configuration however the proposed rearward curvature gives rise to structural and operational disadvantages. Thus for example adjustability of the rotor blades of a Kaplan turbine about a blade axis which extends substantially radially with respect to the axis of rotation, and the variation which is caused thereby in the position of the blade tip in relation to the surrounding housing, require adaptation such that in the region of adjustment of the rotating blades, the housing is of a part-toric shape. That design configuration is intended to minimise the gap losses at the blade tip in all adjustment positions of the rotor blades. That toric configuration of the housing is at its smallest when the leading and trailing edges of the rotor blades, like also the adjustment axis, extend substantially radially with respect to the axis of rotation. Due to the proposed rearward curvature of the rotor blades however, if the substantially radial adjustment axis is retained, the consequence involved is a considerable pivotal travel of the blade tip, which results in a corresponding increase in the size of the toric part of the housing. Corresponding rearward pivotal displacement of the displacement axis such that it is substantially matched in terms of its position to the configuration of the leading edge requires re-designing of the corresponding drive in the hub and involves a considerably larger demand for space. In addition the blades due to the rearward curvature become correspondingly longer and accordingly the level of expenditure on material and the loading acting on the blades become greater.

Furthermore, for the purposes of affording the desired self-cleaning action for water turbines and pumps, it has also already been proposed that, in addition to the regular rotor and/or stator blades, special cleaning blades with a rearwardly curved leading edge should be provided and disposed upstream of the regular blades (EP-A 512 190). That is intended to provide that solid body impurities entrained by the flow are already engaged by the cleaning blades before they reach the leading edges of the regular blades, and are laterally deflected by virtue of the rearward curvature of the leading edges. The provision of additional cleaning blades however requires a considerable level of expenditure and complication and cannot be implemented in turbines and pumps with adjustable blades without a considerable limitation in terms of the adjustment travel.

Therefore the object of the invention is so to design the blades of water turbines or pumps that the desired self-cleaning effect can be achieved even in relation to water turbines or pumps with adjustable blades, in particular rotor blades, without involving a high level of expense.

In accordance with the invention that is achieved in that the leading edges and the trailing edges at least of the rotor blades form a bend projecting in opposite relationship to the direction of flow.

The bend in the leading edge which occurs for example at the longitudinal center of the leading edge provides that the leading edge is curved or inclined rearwardly with respect to the flow starting from the bend towards both ends of the blade. The rearward inclination or curvature which occurs adjoining the bend, relative to the direction of flow, is compensated for by virtue of the fact that, from the one end of the blade, for example from the blade fixing to the rotor hub, the leading edge projects increasingly in opposite relationship to the flow direction. Accordingly the position of the two blade ends relative to each other is not changed or it is immaterially changed, with respect to the corresponding relative position of the blade ends of conventional turbines or pumps with leading edges which extend substantially perpendicularly to the flow direction.

As in addition the trailing edge has a bend in parallel relationship with the leading edge, the flow forces which are effective at the blade profile are not changed. For, the blade cross-sections can be imagined as infinitesimally thin lamellae which, starting from the one blade end, are increasingly displaced relative to each other in opposite relationship to the flow direction and, from the bend, are again displaced increasingly with the flow direction.

The leading and trailing edges can extend in a straight or curved shape in order to form the bend which occurs in the longitudinal configuration thereof. The angle with which the leading and trailing edges deviate from the otherwise usual orientation which is substantially perpendicular to the flow direction should be so great that flow forces acting on the foreign bodies which impinge on the leading edges are to be expected to be sufficient to sweep them away. It is desirably between 10° and 30°. In addition the angles at which the parts of the leading edge, which extend at both sides of the bend, are oriented with respect to the flow direction can be different. The endeavour however is to provide a corresponding angular configuration and position of the bend, which is matched thereto, in the longitudinal configuration of the leading edge, such that the relative position of the two blade ends, particularly in the case of adjustable rotor blades, does not change or changes only immaterially, in comparison with conventional blades.

Figure 2:
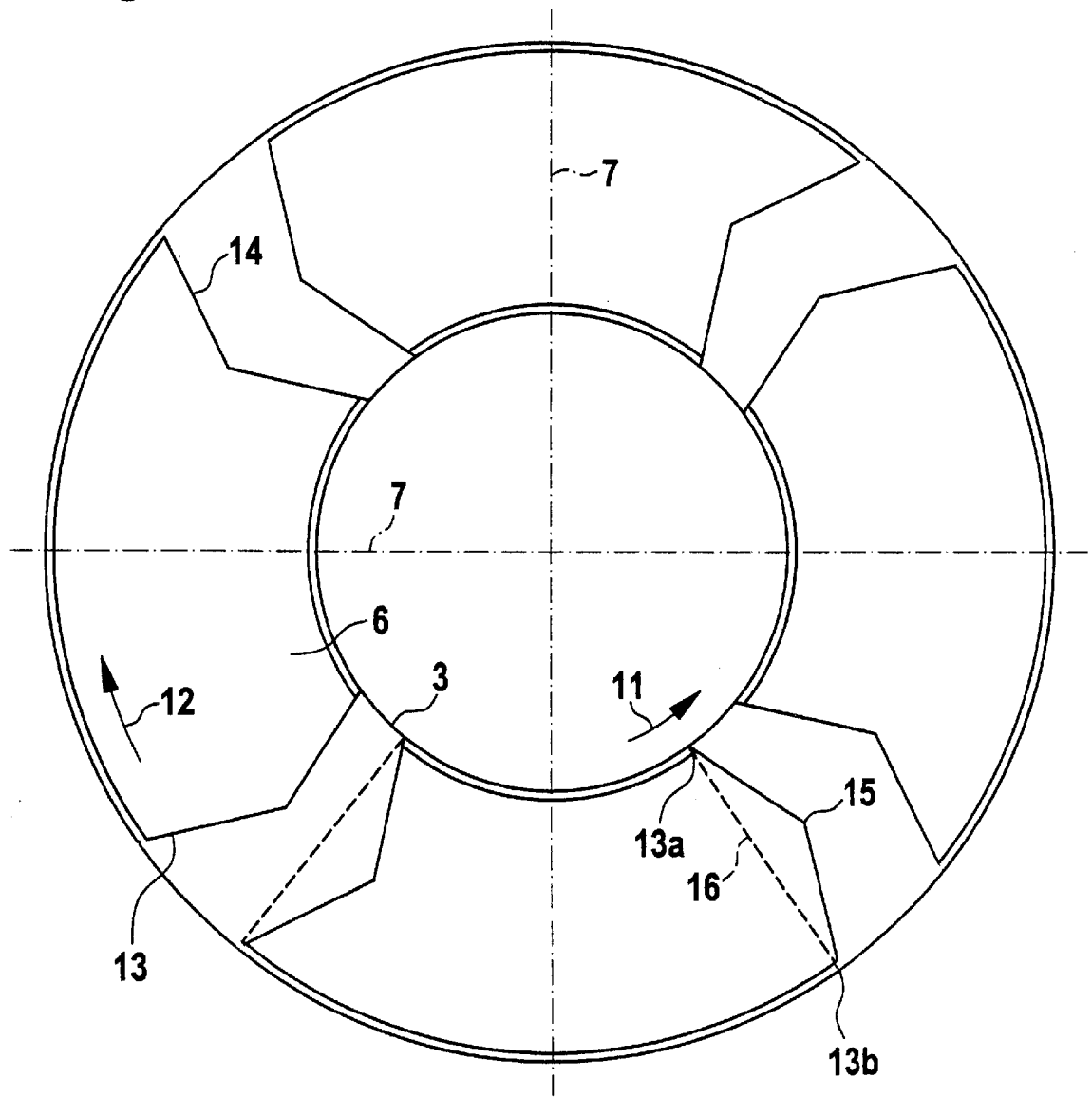

Embodiments of the invention are described in greater detail hereinafter with reference to the accompanying drawings in which:

FIG. 1 is a view in axial section through a flow machine with the rotor being acted upon primarily axially, the left-hand half of the view showing the flow machine in the form of a Kaplan turbine and the right-hand half showing it in the form of an axial pump of corresponding configuration, and FIG. 2 is a diagrammatic plan view of the rotor of the Kaplan turbine shown in FIG. 1.

The left-hand half of FIG. 1 shows a Kaplan turbine having a rotor 1 and a fixed stator 2. The rotor 1 is provided with a hub 3 to which there is connected a shaft 4 leading to a generator (not shown). The hub 3 includes an adjusting device 5 which is known and which is therefore not illustrated in detail and which permits adjustment of the rotor blades 6 about a substantially radially directed adjustment axis 7.

The stator 2 includes a number of stator blades 8 which divert the initially lateral (radial) feed flow of water axially and, depending on their respective setting, in the peripheral direction. For that purpose the stator blades 8 are also pivotable in known manner by way of an adjusting device 9 about an adjusting axis 10.

As can be seen from FIG. 2 the rotor 1 in the Kaplan turbine has rotor blades 6 and rotates in the direction of the arrow 11. The flow direction is indicated by the arrow 12 and the leading edges 13 and the trailing edges 14 of the rotor blades 6 have a bend 15 which is directed in opposite relationship to that flow direction. The leading edges 13, starting from their point 13a which is closest to the hub 3, extend in a straight configuration and inclinedly relative to the flow direction 12 to the bend 15 which is thus disposed upstream from the starting point at the hub 3. From the bend 15, the leading edge again extends straight and inclinedly relative to the flow direction 12, but with the flow direction, so that the point 13b of the leading edge 13, which is at the blade tip, and the point 13a of the leading edge, which is closest to the hub 3, lie on a substantially radially extending line 16 shown in broken line. The line 16 essentially corresponds to the radially extending leading edge of conventional Kaplan turbines.

The trailing edges 14 extend parallel to the leading edges 13 so that, apart from the bend configuration, the cross-sectional profile of each rotor blade 6 is the same as the cross-sectional profile of conventional Kaplan turbines.

Similarly to the rotor blades 6, the leading edges 18 of the stator blades 8 have a bend 20 which projects in opposite relationship to the local flow direction (arrow 19) and from which the leading edge 18 extends inclinedly rearward to the blade ends. The trailing edges 21 extend parallel to the leading edges 18. In regard to the configuration of the leading edges 18 with respect to the flow direction, the foregoing description relating to the rotor blades 6 also applies.

The configuration of the flow machine in the form of a pump as illustrated in the right-hand half of FIG. 1 in principle differs from that of the described Kaplan turbine only by virtue of the opposite flow directions 12' and 19' respectively and the position of the leading and trailing edges, which is correspondingly altered with the direction of rotation being the same. For that reason the foregoing description in connection with the Kaplan turbine correspondingly applies here.

In the above-described embodiments the bend on the rotor blades and the stator blades respectively is arranged substantially at the longitudinal center of the leading edges and the trailing edges respectively. In accordance therewith, the angular configuration of the edges in relation to the flow direction is the same at both sides of the respective bend. Particularly in the case of water turbines and pumps which rotate at a relatively high speed of rotation and at the rotor blades of which therefore a noticeable centrifugal force is operative, it is possible to envisage displacing the respective bend to closer to the rotor hub. The endeavour to keep the position of the blade tips substantially unchanged in comparison with conventional turbines or pumps results in this case in the angle of incidence of the leading edge or the trailing edge respectively with respect to the flow direction in the region which is between the rotor hub and the bend being greater than outside the bend. That affords a stronger flow component in the longitudinal direction of the leading edge, by which the oppositely acting centrifugal force is compensated.

The fact that the position of the blade tip of the rotor blades is substantially retained in comparison with conventional turbines or pumps means that the configuration of a part-toric portion on the housing can also remain unaltered. Accordingly the concept of the invention is found to be particularly advantageous in relation to water turbines and pumps with adjustable rotor blades, but it is not limited thereto in terms of the applicability thereof.

What is claimed is:

1. A flow machine comprising:
a rotor having rotor blades wherein leading edges and trailing edges of the rotor blades form a bend projecting in opposite relationship to a flow direction moving across the blades from the leading edge to the trailing edge of the rotor blades and are inclined rearwardly with respect to the flow direction starting from the bend to both ends of the blades.

2. A flow machine as set forth in claim 1 characterised in that the bend is disposed approximately at the longitudinal center of an edge length.

3. A flow machine as set forth in claim 1 characterised in that the leading and trailing edges extend straight towards and away from the bend.

4. A flow machine as set forth in claim 1 characterised in that an angle formed by the parts of the leading edges and the trailing edges respectively, which are on both sides of the bend, relative to the flow direction, is the same.

5. A flow machine as set forth in claim 1 characterised in that the rotor blades are pivotable about an axis directed substantially radially with respect to the axis of rotation of the rotor.

6. A flow machine as set forth in claim 5, wherein said leading and trailing edges of the rotor blades have a respective first end point closest to a rotor hub and a respective second end point at the blade tip and wherein said first and second points are respectively disposed on a line directed approximately radially with respect to the axis of rotation of the rotor.

7. A flow machine as set forth in claim 1, wherein each rotor blade has a length of its leading edge and trailing edge extending from a respective point adjacent to a rotor hub to a blade tip and the bend is disposed approximately at the longitudinal center of the respective edge length.

8. A flow machine as set forth in claim 1, wherein the leading and trailing edges of the rotor blades have a respective first end point closest to a rotor hub and a respective second end point at a rotor blade tip and wherein the first and second end points are respectively disposed on a line directed approximately radially with respect to an axis of rotation of the rotor.

9. A flow machine as set forth in claim 1, further including a stator spaced a distance from the rotor.

10. A flow machine as set forth in claim 9, wherein the stator includes stator blades having leading and trailing edges, the leading edges and the trailing edges of the stator blades form a bend projecting in opposite relationship to flow direction.

* * * * *

UNITED STATES PATENT AND TRADEMARK OFFICE
CERTIFICATE OF CORRECTION

PATENT NO. : 6,254,338 B1
DATED : July 3, 2001
INVENTOR(S) : Andreas Keller

It is certified that error appears in the above-identified patent and that said Letters Patent is hereby corrected as shown below:

<u>Title page,</u>
Item [22], now reads "PCT Filed: Nov. 11, 1997" should read -- PCT Filed: Nov. 13, 1997 --.

Signed and Sealed this

Twelfth Day of March, 2002

Attest:

JAMES E. ROGAN
*Attesting Officer*     *Director of the United States Patent and Trademark Office*